3,507,916
METHOD OF REMOVING AND PREVENTING THE FORMATION OF COLOR CONTAMINANTS IN METHACRYLIC ACID
Leslie Hunt Sutherland, Wilton, and Erwin F. Schoenbrunn and William F. Newell, Ridgefield, Conn., assignors to Escambia Chemical Corporation, Pace, Fla., a corporation of Delaware
No Drawing. Filed Mar. 29, 1967, Ser. No. 626,691
Int. Cl. C07c 57/04, 51/42
U.S. Cl. 260—526
7 Claims

ABSTRACT OF THE DISCLOSURE

This disclosure concerns a method for removing and preventing the formation of color contaminants in methacrylic acid prepared from isobutane and its derivatives by contacting the methacrylic acid with metallic reducing agents in particulate form such as magnesium, calcium, zinc and cadmium preferably at elevated temperatures.

BACKGROUND OF THE INVENTION

This invention relates to a method of removing and preventing the formation of color contaminants in methacrylic acid through the utilization of metallic reducing agents.

The methods of producing the intermediate product alpha hydroxyisobutyric acid and the end products methacrylic acid or methacrylate esters such as methyl methacrylate are well known and are described in various patents as well as in the literature.

For example, Steadman United States Patent No. 2,811,545 issued on Oct. 29, 1957, describes a method of preparing alpha hydroxyisobutyric acid by oxidizing isobutylene glycol with a nitric acid solution. This intermediate product is then dehydrated to methacrylate acid by heating in the presence of a suitable strong mineral acid such as sulfuric acid or phosphoric acid. The methacrylic acid can be converted to a methacrylate by esterification in the presence of an alcohol solvent mixture. Depending on the ester desired suitable alcohol, such as methanol, ethanol, propanol or butanol may be used.

Robertson et al., United States Patent No. 2,811,546, issued Oct. 29, 1957, describes a similar method wherein the alpha hydroxyisobutyric acid is prepared by oxidizing isobutylene glycol with dinitrogen tetroxide. This intermediate compound can then be converted to methacrylic acid in a manner similar to that described in the Steadman patent referred to above.

The alpha hydroxyisobutyric acid intermediate can also be prepared by oxidizing isobutylene glycol with an alkali metal hydroxide as described in Robertson et al., United States Patent No. 2,824,130 issued Feb. 18, 1958.

Alternative methods of producing alpha hydroxyisobutyric acid from isobutylene nitric acid and oxides of nitrogen are disclosed in Gardner et al., United States Patent No. 2,847,453 issued Aug. 12, 1958 and Robertson et al., United States Patent No. 2,847,465. Both these patents disclose methods of converting the intermediate to methacrylic acid and/or methacrylate esters such as methyl methacrylate.

Additionally, United States patent applications 404,524 (filed Oct. 16, 1964) and 435,702 (filed Feb. 26, 1965) disclose methods of producing alpha hydroxyisobutyric acid by oxidizing isobutylene with dinitrogen tetroxide in a solvent of nitric and acetic acids and oxidizing tertiary butyl esters with nitric acid and oxides of nitrogen to produce alpha hydroxyisobutyric acid respectively.

Methacrylic acid and its esters are very valuable chemicals having wide utility in the plastics industry.

SUMMARY OF THE INVENTION

The preferred oxidation reaction for preparing alpha hydroxyisobutyric acid is shown by the following equations:

(1)

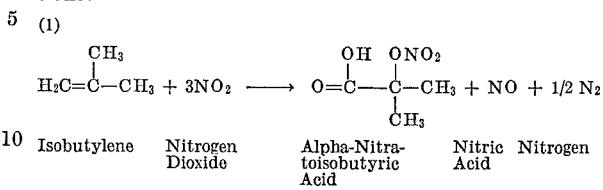

| Isobutylene | Nitrogen Dioxide | Alpha-Nitratoisobutyric Acid | Nitric Acid | Nitrogen |

(2)

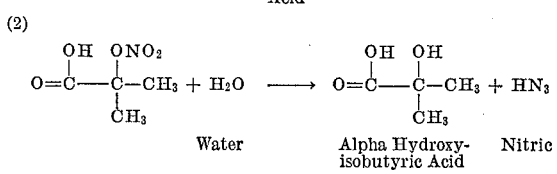

| | Water | Alpha Hydroxyisobutyric Acid | Nitric |

After purification of the alpha hydroxyisobutyric acid it is then dehydrated to methacrylic acid according to any of the methods described in the above mentioned patents. The resulting methacrylic acid is then purified by distillation.

The methacrylic acid produced according to this preferred method and the other methods mentioned above, however, even after normal purification by distillation develops a yellow coloration upon aging and storage. This color formation is accelerated by elevated temperatures or by ultra violet irradiations such as occur upon exposure to sunlight.

While the chemical reactions and mechanisms which produce color or colored bodies in methacrylic acid prepared from isobutane and its derivatives such as, for example, isobutylene and isobutylene glycol, upon aging, heating or exposure to ultra violet light are not completely known, it is believed that by-products such as biacetyl and unstable nitrogen containing compounds which produce nitrogen oxides, e.g., nitroisobutylene, which are present as impurities in methacrylic acid have an effect on and are among the reasons for color formation in methacrylic acid.

For example, alpha nitroisobutylene has a vapor pressure close to that of methacrylic acid. Based upon Raoult's law, the volatility of alpha nitroisobutylene is only 1.2 times that of methacrylic acid at 100° C. Thus, while it is theoretically possible to separate this impurity from methacrylic acid by fractional distillation, such a procedure would be expensive and time consuming requiring several consecutive fractionations. A sample of methacrylic acid containing approximately 300 parts per million of alpha nitroisobutylene was distilled in a two foot column packed with .25 in. glass helices at a 3:1 reflux ratio. Five equal fractionations were obtained. Only the last three fractionations did not color detrimentally. Therefore, forty percent of the sample had to be discarded to obtain a satisfactory product.

Because of the relative vapor pressure of methacrylic acid, and that of the various objectionable impurities found in the product, it is highly desirable to provide a process wherein the coloring characteristics of methacrylic acid can be reduced or eliminated by chemical treatment of methacrylic acid following its preparation.

It is an object of this invention to inhibit the color forming characteristics of methacrylic acid produced from isobutane and its derivatives by subjecting the product containing methacrylic acid to a final heating step in the presence of a metal selected from the group consisting of magnesium, calcium, zinc and cadmium followed by a simple distillation without fractionation. The most preferred reducing metals are zinc and magnesium.

It is a further object of this invention to provide methacrylic acid which will be free from objectionable color or color formation upon aging or ultra violet light irradiation due to the presence of biacetyl and unstable nitrogen containing compounds which produce nitrogen oxides. This and other objects of the invention will become apparent to those skilled in the art from a reading of the entire specification.

Table I below shows the degree of coloration of various samples of methacrylic acid upon aging. All percentages are by weight unless otherwise indicated.

TABLE I

| Sample | Treatment | APHA Color | | | |
|---|---|---|---|---|---|
| | | Before aging | Aging at 90° C. | | Ultra-violet radiation [1] |
| | | | 2 hrs. | 5 hrs. | |
| No. 1 | None | 5 | 5 | 20 | 15 |
| No. 2 | do | 35 | 50 | 100 | >100 |
| No. 2A | Held at 90° C. ½ hr. and distilled. | 15 | 15 | 35 | >100 |
| No. 2B | W/1% Zn ½ hr. at 85° C. and distilled. | 5 | 5 | 30 | >100 |
| No. 2C | W/2% Zn ½ hr. at 85° C. and distilled. | 5 | 5 | 20 | 10 |
| No. 2D | W/1% Mg ½ hr. at 85° C. and distilled. | 5 | | | 20 |
| No. 2E | W/1% Fe ½ hr. at 85° C. and distilled. | 45 | 60 | >100 | >100 |
| No. 2F | Distillation of No. 2, 5% overhead. | | | | 55 |
| No. 2G | Distillation of No. 2, 16% overhead. | | | | 40 |
| No. 2H | Distillation of No. 2, 32% overhead. | | | | 20 |
| No. 2I | No. 2 batch distillation overhead product of 2H. | | | | >100 |

[1] Held 16 hrs. in a clear 4 oz. bottle next to a Sylvania 15W Blacklite Blue.

Sample No. 1 is methacrylic acid having no alpha nitroisobutylene impurity. Sample No. 2 is a methacrylic acid having the following impurities present.

| Component: | Concentrations in p.p.m. |
|---|---|
| Unknown | 49 |
| Acetone | 194 |
| Methyl methacrylate | 5 |
| Nitromethane | 27 |
| Methyl α-hydroxyisobutyrate | 287 |
| Tetramethyl dioxolanone | 394 |
| Acetic acid | 1188 |
| α-Nitroisobutylene | 338 |
| Isobutyric acid | 1108 |

Most commercial specifications require that methacrylic acid have an APHA Color of 25 or below after aging or ultra violet irradiation. The APHA color is measured by matching the color of a sample to that of one of a series of Standard solutions of potassium chloroplatinate made up according to the specifications of the American Public Health Association.

From the attached table it can be seen that the contacting of methacrylic acid with iron followed by distillation has little or no tendency to inhibit or reduce the coloring of methacrylic acid (Sample No. 2E).

Samples No. 2B and 2D show that some inhibition of color formation is obtained by contacting methacrylic acid containing 338 p.p.m. of alpha nitroisobutylene with amounts of magnesium and zinc as low as 10,000 p.p.m.

Sample No. 2C shows that color formation can be stopped or inhibited to an acceptable limit under all the recognized test procedures.

Samples No. 2F through 2I show that without chemical treatment only the product obtained after removing about 30% of impure product overhead produced methacrylic acid which shows acceptable coloration limits upon ultra violet radiation.

Steady state distillation of methacrylic acid through two foot columns at a 3:1 reflux ratio produced unacceptable colored product upon ultra violet irradiation.

TABLE II

| Sample | Treatment | Color (APHA) | | | |
|---|---|---|---|---|---|
| | | Before aging | Aged at 90° C. | | Aged by U.V. |
| | | | 2 hrs. | 5 hrs. | |
| No. 3 | Hold at 90° C., 0.5 hr., distilled. | 15 | 15 | 35 | >100 |
| No. 3A | Add 1% Zn, hold at 85° C., 0.5 hr., distilled. | 5 | 5 | 30 | >100 |
| No. 3B | Add 2% Zn, hold at 85° C., 0.5 hr., distilled. | 5 | 5 | 20 | 10 |
| No. 3C | Add 1% Fe, hold at 85° C., 0.5 hr., distilled. | 45 | 60 | >100 | >100 |
| No. 3D | Add 1% Mg, hold at 85° C., 0.5 hr., distilled. | 5 | | | 20 |
| No. 3E | Add 2% Mg, hold at 85° C., ½ hr., distilled. | 5 | | | 25 |
| No. 3F | Add 1% Al, hold at 85° C., ½ hr., distilled. | 15 | | | >100 |
| No. 3G | Add 2% Al, hold at 85° C., ½ hr., distilled. | 15 | | | >100 |

Sample No. 3 of Table II had a composition similar to that of Sample 2 and had approximately 340 p.p.m. of alpha nitroisobutylene. Sample No. 3 after heating and distillation but without metal treatment shows unacceptable coloration after prolonged aging. Unacceptable levels are shown when aluminum or iron are used as the treating metal (Samples No. 3C, 3F and 3G). The treatment of this methacrylic acid sample with 10,000 p.p.m. zinc or 10,000 p.p.m. magnesium show improved color inhibition or prevention (Samples 3A, 3D). However, to achieve satisfactory inhibition under rigorous conditions it is necessary to use amounts of about 20,000 p.p.m. magnesium or zinc with this sample (No. 3B and 3E).

Treatment of methacrylic acid produced from reactants including nitrogen containing impurities by contacting said methacrylic acid with a particulate metal selected from the group consisting of magnesium, calcium, zinc and cadmium at raised or elevated temperatures provides a product which will not color or produce colored bodies to an unacceptable degree.

It is preferred to use the metal in finely divided or powdered form. Obviously when very fine metal powders of small mesh size are used the time and/or temperature of contact necessary to remove or prevent the formation of color contaminants will be reduced.

Preferably when using a powdered metallic reducing agent such as zinc or magnesium the methacrylic acid should be contacted for a time period of approximately one half hour at temperatures in the vicinity of about 80° C. to 90° C.

The metal treating agent should be present in the order of from about 33 to about 66 parts or above per part of the objectionable impurity present in the methacrylic acid to be treated. Preferably, the treating metal should be present in the order of about 66 parts per part of objectionable impurity. Larger amounts of treating metal can be used to remove or inhibit the color forming bodies or compounds. However, large excesses of treating metal tend to cause the excessive production of isobutyric acid, an undesirable impurity, which is difficult to remove from the methacrylic acid.

With respect to nitroisobutylene it is sufficient if enough treating metal is used to reduce that impurity to amounts in the range of from about 10 to 20 p.p.m. At elevated temperatures in the presence of zinc the alpha nitrosiobutylene is believed to be converted to isobutyraldoxime, a compound which does not form or break down to form colored bodies upon aging or ultra violet irradiation.

The amount of alpha nitroisobutylene as well as other objectionable impurities in a given sample before or after treatment can be ascertained by simple gas chromatography. After determining the amount of total impurity, a sufficient amount of treating metal can be added to a suitable vessel and maintained there at elevated temperatures for a suitable contact time followed by simple batch distillation to separate the methacrylic acid from the zinc.

The terms and expressions employed are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:

1. A method of removing and preventing the formation of color contaminants in methacrylic acid prepared by the oxidation of isobutylene with an oxide of nitrogen to produce alpha-hydroxy-isobutyric acid followed by dehydration of the latter to form methacrylic acid which comprises contacting said methacrylic acid with a metallic reducing agent in particular form selected from the group consisting of magnesium, calcium, zinc and cadmium at elevated temperatures.

2. A method of removing and preventing the formation of color contaminants in methacrylic acid having unstable nitrogen compounds which produce nitrogen oxides present as impurities which comprises contacting said methacrylic acid with a metallic reducing agent in particulate form selected from the group consisting of magnesium, calcium, zinc and cadmium at elevated temperatures.

3. A method in accordance with claim 2 wherein the impurity present in the methacrylic acid is nitroisobutylene.

4. A method in accordance with claim 3 wherein the metallic reducing agents powdered zinc present in amounts of at least about 33 parts per part of nitroisobutylene impurity.

5. A method in accordance with claim 3 wherein the metallic reducing agent powdered zinc present in amounts of at least about 33 parts per part of nitroisobutylene impurity.

6. A method in accordance with claim 3 wherein the methacrylic acid is contacted with the metallic reducing agent for a time period of approximately one half hour, at temperatures in the vicinity of about 80° C. to about 90° C.

7. A method in accordance with claim 2 wherein the methacrylic acid is removed from the mixture of methacrylic acid and metallic reducing agent by batch distillation.

References Cited

UNITED STATES PATENTS 2,866,817   12/1958   Montagna et al. _____ 260—256

JAMES A. PATTEN, Primary Examiner

PO-1050
(5/69)

UNITED STATES PATENT OFFICE
CERTIFICATE OF CORRECTION

Patent No. 3,507,916            Dated April 21, 1970

Inventor(s) Leslie Hunt Sutherland et al

It is certified that error appears in the above-identified patent and that said Letters Patent are hereby corrected as shown below:

Column 2, lines 10 and 11, "Nitric Acid" should be --Nitric Oxide--.

Column 2, line 15, "$HN_3$" should be --$HNO_3$--.

Column 2, lines 18 and 19, the word "Nitric" should be --Nitric Acid--

Column 6, line 22, "agents" should be --agent.

Column 6, line 22, after "agent" the word "is" is omitted.

Column 6, line 26, the words "powdered zinc" should be --is magnesium--.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents